United States Patent [19]

Hegler et al.

[11] 3,996,323
[45] Dec. 7, 1976

[54] METHOD OF PRODUCING DOUBLE-WALLED SYNTHETIC PLASTICS TUBES HAVING AN OUTER WALL WITH ANNULAR OR HELICAL CORRUGATIONS

[76] Inventors: Wilhelm Hegler; Ralph-Peter Hegler, both of Goethe Str. 2, 873 Bad Kissingen, Germany

[22] Filed: Mar. 3, 1975

[21] Appl. No.: 554,946

[30] Foreign Application Priority Data

Mar. 22, 1974 Germany .......................... 2413878

[52] U.S. Cl. ................................. 264/89; 264/95; 264/99; 425/326 R
[51] Int. Cl.[2] ........................................ B29C 17/07
[58] Field of Search ......... 264/89, 95, 99, DIG. 52; 425/326 R, 370, 387

[56] References Cited

UNITED STATES PATENTS

| | | | |
|---|---|---|---|
| 3,280,430 | 10/1966 | Antrobus | 425/370 |
| 3,538,209 | 11/1970 | Hegler | 264/99 |
| 3,689,610 | 9/1972 | Nicholson | 264/89 |

FOREIGN PATENTS OR APPLICATIONS

| | | |
|---|---|---|
| 1,258,181 | 12/1971 | United Kingdom |

*Primary Examiner*—Robert F. White
*Assistant Examiner*—T. E. Balhoff
*Attorney, Agent, or Firm*—Burgess, Dinklage & Sprung

[57] ABSTRACT

An improvement in the process of producing a double-walled synthetic plastic tube having a concentric outer tube and an inner tube wherein an outer tube of molten synthetic plastic is extruded from an annular die and passing to a mold cavity formed by a divided mold having two cooperating endless recirculating trains of mold halves which close to complete the mold cavity and an inner tube of molten synthetic plastic is extruded from a die orifice located in the interior of said mold which improvement comprises introducing a first gas into the space between said inner tube and said outer tube before said synthetic plastic has fully hardened, said gas being at a pressure above atmospheric and at a temperature at or above the softening point of said synthetic plastic and permitting said outer inner tubes to cool; an apparatus for carrying out the process comprising an extruder having a first die disposed over a first mandrel to define a first annular space through which molten synthetic plastic can flow en route to a mold cavity of the type described, a second annular die concentric to a first mandrel and a second mandrel concentric to said first die, said second mandrel and said second die disposed to define a second annular space through which additional molten synthetic plastic can flow wherein a first gas channel entering the region between the first annular space and the second annular space is provided to supply fluid gas between the outer wall of the inner tube and the inner wall of the outer tube as the tubes emerge from the respective dies.

9 Claims, 4 Drawing Figures

METHOD OF PRODUCING DOUBLE-WALLED SYNTHETIC PLASTICS TUBES HAVING AN OUTER WALL WITH ANNULAR OR HELICAL CORRUGATIONS

BACKGROUND OF THE INVENTION

1. Field of the Invention

This invention relates to a process and apparatus for the manufacture of a tube composed of concentric inner and outer tubes. This invention is particularly directed to the production of a double-walled synthetic plastic tube which has an outer tube which is annularly or helically corrugated. This invention is particularly directed to a process which will insure that the inner tube is properly disposed with respect to the outer tube, particularly when the outer tube has helical corrugations so that the inner tube uniformly touches the nadir of the corrugations of the outer tube.

2. DISCUSSION OF THE PRIOR ART

According to German patent specification 1,704,718 it is known to produce synthetic plastic tubes having an annularly or helically corrugated outer wall and a substantially smooth inner wall by extruding two concentric tubes in one operation. The outer tube is extruded from an annular extrusion die into a mold cavity formed by divided molds having transverse internal grooves and forming two cooperating endless recirculating trains of mold halves which close to complete the mold cavity. The tube is drawn into the transverse grooves by vacuum pressure. The inner tube is extruded from a die extending into the interior of the molds and brought into close contact with the fully formed outer tube.

This method permits the construction of double-walled tubes but where the tubes have a smaller cross section and are to be produced at a high production rate, difficulties arise because of pressure differentials within the region between the inner tube and the outer tube. These pressure differentials cause the inner tube to be drawn into the corrugations of the outer tube or to form inwardly projecting bulges between the internal press of the corrugations. Such tubes lack the desired smooth internal surface which instead is slightly angular. This angular construction considerably increases the drag when liquids or gases are conducted through such tubes.

According to U.S. Pat. No. 2,280,480 it is known to produce double-walled tubes by dividing the stream of plastic to be extruded into two component streams which emerge from two annular extrusion dies arranged in tandem. It is also known to introduce compressed air between these annular dies and into the interior of the inner tube for effecting the desired forming operation. However, control of the two synthetic plastic streams and of the relative pressures thereof with respect to the compressed air presents considerable difficulties in commercial operations.

It has, therefore, become an object of the present invention to overcome these difficulties and to provide a double-walled tube wherein the inner wall is substantially smooth and is neither drawn into the corrugations of the outer tube nor caused to form inwardly projecting annular bulges. It is another object of this invention, therefore, to provide a double-walled tube wherein the outer wall has helical corrugations and the inner wall is smooth further characterized in that the inner wall touches the outer wall only at the nadir of its corrugations.

It has long been recognized that problems are encountered in the formation of double-walled tubes especially those having helical corrugations which difficulties are caused by certain phenomena experienced during the cooling of the freshly extruded molten synthetic plastic. Thus, it was found that when the inner tube which is still plastically formable is cooled that the pressure in the space between the tubes is different from the pressure within the inner tube itself. The resultant pressure differences cause the inner wall to be additionally deformed. In the case of tubes having a helically corrugated outer wall, the intermediate space between the tubes communicates with the ambient atmosphere. However, the communicating channel is of considerable length and can be as long as 28 meters per meter of tube in a tube having an internal diameter of 6 cm. and 150 corrugations per meter. In other words, when 10 meters of each tube are being extruded, the total length of this channel is already 280 meters.

In view of the length of this communicating channel, pressure fluctuations inside the corrugations cannot be compensated quickly enough by the ambient pressure and, depending upon the rate at which the air in these corrugations is heated or cooled, considerable gauge or vacuum pressures may actually rise. If the tube is provided with a self-contained annular corrugation, a compensation of pressure fluctuations by the ambient pressure is virtually impossible.

A smooth inside wall can, therefore, be obtained only if the production process can be suitably controlled to insure that at least in the zone where the inner tube is still in the plastically formable state and has not yet fully set, the pressure in the space between the two tubes is the same as the pressure inside the inner tube.

SUMMARY OF THE INVENTION

The problems summarized above with respect to the creation of pressure differentials within the various spaces within a double-walled synthetic plastic tube are solved by an improved process. The process on which the present invention is an improvement is a process of producing a double-walled synthetic plastic tube having a concentric outer tube and a concentric inner tube wherein an outer tube of molten synthetic plastic is extruded from an annular die and passed into a mold cavity formed by a divided mold having two cooperating endless recirculating trains of mold halves which close to complete the mold cavity and an inner tube of molten synthetic plastic is extruded from a die orifice located in the interior of said mold. The process is improved by introducing a first gas into the space between said inner tube and said outer tube before said synthetic plastic has fully hardened, said first gas being at a pressure above atmospheric and at a temperature at or above the softening point of said synthetic plastic and thereafter permitting said outer and inner tubes of synthetic plastic material to cool.

According to the invention, therefore, the problems attendant the production of double-walled synthetic tubes are solved by introducing a supporting gas, e.g., air into the space between the tubes which is at a pressure above atmospheric and at a temperature corresponding to or higher than the softening point of the synthetic plastic material. The increased pressure exerted by the supporting air acts as a cushion assisting in the molding of the outer tube and the raised temperature of the gas prevents the outer tube from cooling too rapidly. Thus, in the present invention the hardening of the outer tube is restrained until the pressure within the inner tube and the pressure in the zone between the tubes are about equal.

As soon as the two tubes have become welded together the space between the outer and inner tube contains air at elevated pressure and at elevated temperature. However, the pressure gradually falls to atmospheric as the temperature falls to room temperature. The supporting air introduced into the space between the outer and inner tubes must, therefore, be introduced at a gauge pressure which is so calculated that during the cooling of the outer tube to below its softening point in that zone where the inner tube is still plastically formable, the pressure existing in the intervening spaces between the two tubes is at least approximately equal to the pressure existing in the same zone in the interior of the inner tube.

The process is generally conducted by utilizing a second gas which is introduced into the space within the inner tube, this second gas being also at an elevated temperature and at an elevated pressure within the inner tube. This second gas is introduced into the interior of the inner tube, which can be sealed from the external atmosphere. The interior of the inner tube should be understood to be the space which in conventional manner is closed by a mandrel extension. This extension need not necessarily completely seal the interior from the outside, since an air gap between the mandrel extension and the inside of the extruded tube can be present provided that a pressure difference between the interior on the upstream side of the mandrel extension and the interior on the downstream side of the extension is maintained.

Preferably, the pressure and temperature of the first gas, herein denominated as supporting air A, and the pressure and temperature of the second gas, herein denominated supporting air B, are separately measured and controlled. Preferably, the supporting air A should be about 0.5 to 3% above atmospheric and the temperature of the supporting air A should be above that of the supporting air B which in turn should be at a pressure between 8 and 15% above atmospheric.

While air is the preferred gas for purposes of this invention it should be understood that other gases can be employed, notably, nitrogen, oxygen, carbon dioxide, helium, argon and other inert gases including steam.

The pressure within the inner tube is greater than the pressure in the intermediate space between the inner tube and the outer tube, although pressure fluctuations can exist. The magnitude of the pressure differences depends upon the dimensions of the tube to be produced and upon the thickness of the inner tube. If a very thin walled inner tube is produced where the innerwall has only the thickness of a foil or film, then only a very minor pressure difference need exist. For instance, for thin walled inner tubes an excess pressure of only 0.005 atmospheres need be employed, i.e., a 0.5% excess pressure. In the case of thick walled inner tubes a pressure up to 3% atmospheric pressure may be employed. The pressure within the inner tube itself in such case ranges generally between 103 and 115% of the pressure between the two tubes.

The process of this invention can be performed in the formation of numerous synthetic plastic tubes of varying chemical compositions. It is particularly useful in the formation of synthetic plastic tubes from thermoplastic materials. Particularly contemplated are polyolefin materials especially polyethylene, polypropylene, polybutene-1, polybutadiene, styrene, polyvinylchloride, chlorinated polyethylene, polyvinyl fluoride, polyvinyl bromide, polyvinyl acetal, polyesters, polyamides especially those of the nylon series, polyimides and copolymers of the above-named materials.

BRIEF DESCRIPTION OF DRAWINGS

The invention can be more readily understood and appreciated when reference is made to the accompanying drawings in which.

DESCRIPTION OF SPECIFIC EMBODIMENTS

Figure 1:
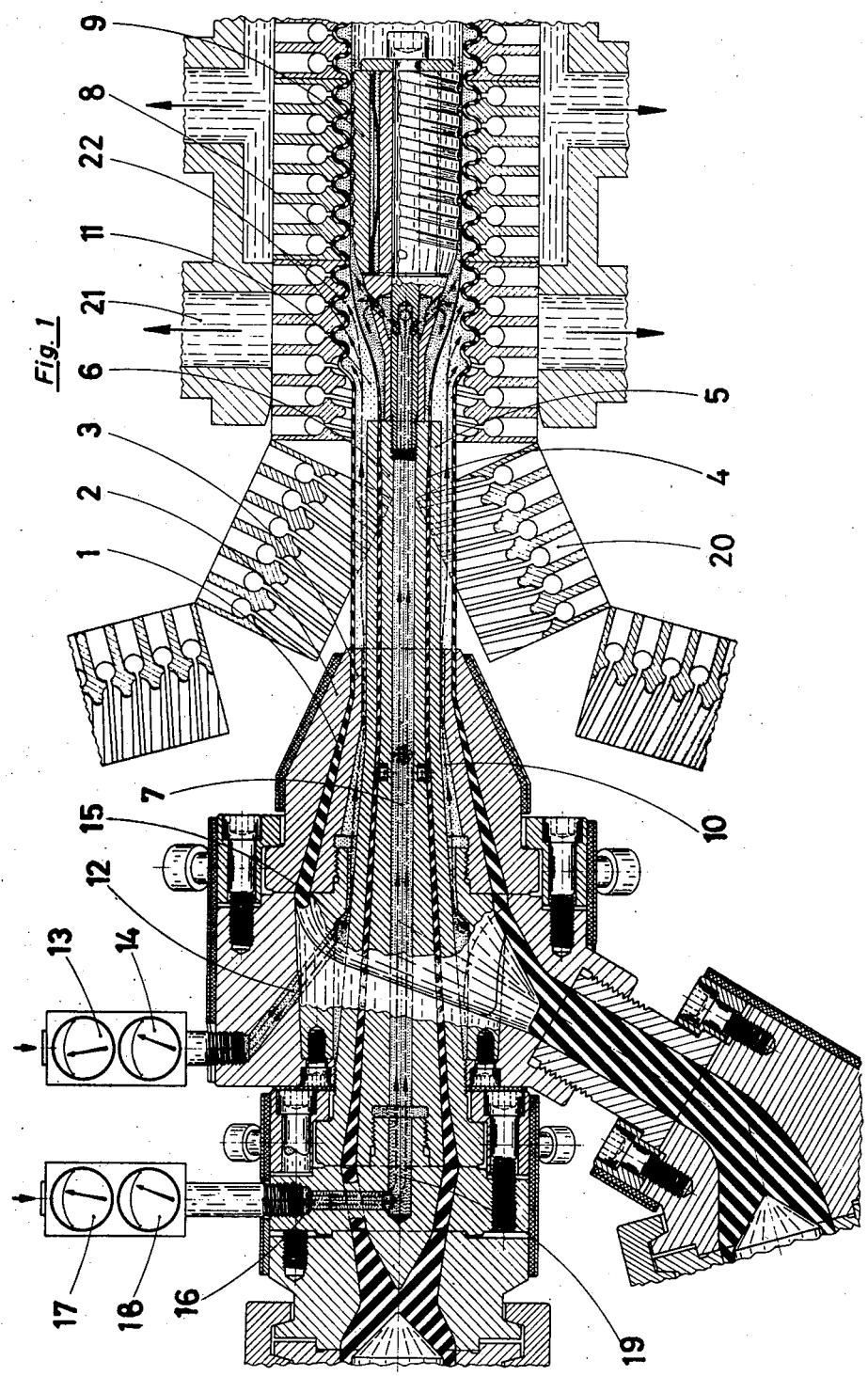
FIG. 1 is a side sectional elevation of an apparatus suitable for carrying out the process of this invention.

Referring to the drawings herein there is provided an apparatus for performing the described method which has measuring points for measuring the temperature of the respective supporting air streams. These measuring points are preferably situated on the upstream side of the point of entry of the air into the extrusion head. On the other hand, it has been found best to locate the pressure measuring point inside the extrusion head. Contrary to known arrangements, the apparatus of the present invention contains completely separate gas channels in the extrusion head for admission of the supporting air A and of the supporting air B. For this purpose the mandrel of the extrusion die extruding the inner tube can contain an axial bore for the admission therethrough of the supporting air B whereas the mandrel of the extrusion die extruding the outer tube is divided to form an annular channel for the admission therethrough of the supporting air A. If a mandrel extension is present for the purpose of sealing the interior of the inner tube from the outside atmosphere and for pressing the inner tube against the inside of the outer tube, then the supporting air B is preferably introduced on the upstream side of this mandrel.

Referring to FIG. 1, an external tube 1 is extruded from a die 2 over a mandrel 3, whereas an inner tube 4 is extruded from a die 5 over a mandrel 6. This inner mandrel 6 contains an axial bore 7 through which supporting air B enters to be admitted into the interior of the tube 4 through orifices at 8, the interior being sealed from the outside by a mandrel extension 9.

An annular channel 10 through which supporting air A is admitted is provided between the mandrel 3 of the extruding die for the external tube and the tubular die 5 for the inner tube. The supporting air A leaves the exit opening of the annular channel 10 and enters the space 11 between the plastically formable outer synthetic plastics tube 1 and the tubular extrusion die 5 beyond the orifice of the die 5. The supporting air A reaches the annular channel 10 through an oblique bore 12. Heating means not shown in the drawing raise the temperature of the supporting air to the required level. Measuring instruments 13 and 14 are provided to measure the pressure and temperature of the supporting air A. The temperature may be measured directly where the measuring instrument is located, whereas preferably the pressure is measured inside the extrusion head roughly at the point 15 because from this point onwards the supporting air flows through the hot extrusion head through a channel of relatively large cross section offering little resistance to flow, so that the pressure drop from point 15 to the exit orifice of the die will not be significant. The supporting air B is introduced into the central bore 7 in mandrel 6 through a lateral duct 16. Again measuring instruments 17, 18 for measuring pressure and temperature of the supporting air B which is preheated to the required temperature by heating means not shown in the drawing, are provided at the point where the air enters. The pressure of the supporting air B is preferably also measured inside the extrusion head roughly at 19.

The outertube which emerges from the die 2 in a hot plastic state is introduced in a manner that is well understood into the path of an endless train of separate molds 20. When these molds have closed grooves provided in conventional manner in the interior mold walls are brought into communication with a suction channel 21 through which the air is withdrawn from the molds in a manner quickly drawing the outer tube into the grooves of the mold by the difference between the pressure on the outside which is well below atmospheric and the internal pressure which is something like 0.5 to 3% above atmospheric. The supporting air A, as indicated by arrows 22, enters the corrugations on the inside of the outer tube. The molds 20 are externally cooled so that the outer tube is fairly rapidly cooled as soon as it makes contact with the grooved inside mold walls. The inner tube 4 which emerges from the die 5 is expanded into contact with the setting outer tube 1 provided the pressure of the supporting air B entering through the orifices 8 is a little above that existing in space 11. The mandrel extension 9 pushes the inner tube 4 against the outer tube 1 like a pressing iron so that the two tubes are well bonded together by fusion. At the same time the mandrel extension 9 ensures that the slight excess pressure of the supporting air B entering through the orifices 8 is maintained.

Figure 2:
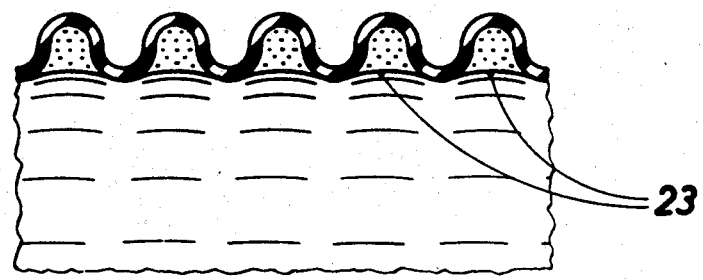
FIG. 2 is a sectional elevation of a corrugated tube produced by prior art processes in which the inner tube has been caused to bulge outwardly into the interior of the corrugations of the outer tube.
Figure 3:
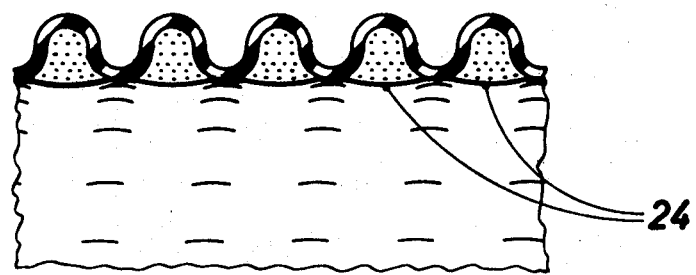
FIG. 3 is a similar sectional elevation showing problems attendant other prior art processes wherein the inner tube is caused to project radially inwardly and away from the outer tube.
Figure 4:
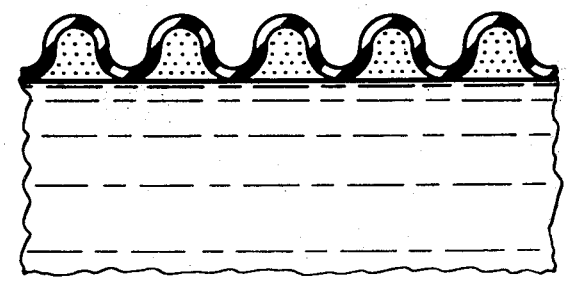
FIG. 4 is a cross section of a tube produced by the within described process.

In order to create a satisfactory fusion bond between the inner and outer tubes it is desirable to ensure that the inner tube is quickly expanded into contact with the inside of the outer tube, i.e., without delay after the outer tube had been molded. It is the aim that the inner tube should already make contact with the inside crest of the second or third corrugation after evacuation begins. As the mold continues to travel the outer tube which bears against the water-cooled wall of the mold will cool quickly, whereas the inner tube which is separated from the cooled mold by an air cushion cools much more slowly and thus remains in the plastic state for a much longer time. The air inside the corrugations slowly cools by contact with the cooling outer tube and at the same time its pressure also drops. If the pressure drop is excessive so that the pressure inside the corrugation is less than that inside the inner tube, as indicated in FIG. 2 at 23, will be drawn slightly into the corrugations. On the other hand, if the air pressure inside the corrugations is too high then, as shown in FIG. 3 at 24, the inner tube will conversely form inward bulges. However, if temperature and pressure of the supporting air A and of the supporting air B are correctly matched, then the pressure in the corrugations will remain the same as that inside the inner tube while the inner tube sets and, as shown in FIG. 4, the inside wall will be smooth and the resistance to flow will not be affected. Tests have shown that the condition illustrated in FIG. 4 can be attained even when the inner wall is only a very thin extruded film reduced to a thickness of as little as 0.05 mm. This extreme thinness of the inner wall not merely saves a considerable amount of raw material, but it also has the effect that the inner tube does not reduce the flexibility of the entire tubing and in practice a double-walled tube of the described kind is as flexible as a conventional transversely corrugated tube lacking a second internal wall.

A preferred extrusion apparatus for carrying out the process of this invention and for producing double-walled synthetic plastic tubes is of the type disclosed in copending application Ser. No. 529,657 filed Dec. 4, 1974 entitled "An Extruder Head For Extruding An Outer Tube Or Sheath About An Inner Tube Or Cable" of Wilhelm Hegler and Ralph-Peter Hegler, the disclosure of which is hereby specifically incorporated herein by reference.

In order to more fully illustrate the nature of the invention and the manner of practicing the same the following example is presented.

EXAMPLE

Into an extrusion apparatus of the type shown in FIG. 1 there is passed two separate streams of molten polyvinyl chloride having a softening point of about 215° C. A portion of this stream passes axially through the extruder of FIG. 1 to form the inner tube. Another portion is introduced into the extruder at an acute angle thereto and by a dividing U-shaped insert having a leading parting edge is separated into a U-shaped configuration and flows, in the manner described in said copending application Ser. No. 529,657 to form an outer wall or tube of molten polyvinyl chloride. The polyvinyl chloride entering the extruder at the acute angle flows between a first die and a first mandrel to form an annular molten tube of polyvinyl chloride. The term "molten" is used to refer to a plastically formable state in which the plastic mass exists. This mass is formed into an outer wall 1 as it passes in an annular space between the first die and the first mandrel. It exists at the extrusion head where it passes into a mold cavity defined by mold halves which halves are provided on a pair of facing and cooperating endless recirculating trains of mold halves.

The first mentioned stream of synthetic plastic material passes through an annular defined by a second die and a second mandrel. The second die and second mandrel are concentric to the first die and first mandrel. The mass exits from the annular space and in a plastically formable state is picked up by a mandrel extension. This mandrel extension is disposed within the mold cavity and serves to carry the second annular tube or inner tube to an abutting position with respect to the outer wall formed using the first die and first mandrel. The outer wall is formed into transverse corrugations owing to cooperating corrugations in the mold halves. The mandrel extension brings the inner tube in contact with the nadir of the corrugations of the outer tube.

During this process there is passed a gas through channel 12 which passes in the inner space between the inner tube and the outer tube which gas is at a temperature of about 200° C and is under a pressure of about 1.02 atm. Simultaneously therewith a second gas from a second source is passed through an axial bore 17 disposed within the inner tube which gas enters within the inner tube. This gas is at a temperature of about 185° C. and has a pressure of about 1.12 atm. By the production of a tube having an external diameter of 50 to 80 mm the outer tube and the inner tube are passed through their respective mandrels at a rate of about 30 meters per minute respectively of about 15 meters per minute so that the overall production rate is about 1,000 meters of double-walled synthetic plastic tube per hour. The outer and inner tubes are prevented from rapid cooling in the region wherein the outer tube is initially formed into transverse corrugations, but takes place immediately after the forming has finished, i.e., after the outer tube has passed about 12 cm from the annular orifice through which it has emerged and until the inner tube has passed about 4 cm from the annular space through which it has emerged. A vacuum is applied to the outer tube exteriorly of the mold halves to insure that the molten material maintains helical transverse corrugations.

What is claimed is:

1. In a process of producing a doublewalled synthetic plastic tube having a concentric outer tube and an inner tube wherein an outer tube of molten synthetic plastic is extruded from an annular die and passed into a mold cavity formed by a divided mold having two cooperating endless recirculating trains of mold halves which close to complete the mold cavity, a negative pressure is applied to said outer tube to draw the same against the walls of said mold and an inner tube of molten synthetic plastic is extruded from a die orifice located in the interior of said mold, the improvement which comprises introducing a first gas into the space between said inner tube and said outer tube before said synthetic plastic has fully hardened, said first gas being at a pressure above atmospheric and at a temperature at or above the softening point of said synthetic plastic, a second gas being introduced within said inner tube and adjusting the pressure of said first gas with the pressure of said second gas such that they are substantially the same before said inner tube begins to set permitting said outer and inner tubes to cool and maintaining the first, and second gases at substantially the same pressure until the inner tube is set.

2. A process according to claim 1 wherein said first gas is introduced into said space at a pressure such that during cooling of the outer tube below its softening point, the pressure in said space between the outer and inner tube is substantially the same as the pressure of any gas within said inner tube.

3. A method according to claim 2 wherein said second gas is at an elevated temperature and at an elevated pressure within said inner tube.

4. A method according to claim 3 wherein said first gas and said second gas are introduced into the respective spaces from separate controllable sources having independent pressure regulating means.

5. A method according to claim 1 wherein said first gas is at a pressure of about 0.5 to 3% above atmospheric.

6. A method according to claim 3 wherein the temperature of said first gas is higher than the temperature of said second gas.

7. A method according to claim 6 wherein said second gas has a pressure between about 8 and 15% above atmospheric.

8. A method according to claim 7 wherein the pressure of said second gas is between 103 and 115% of the pressure of said first gas.

9. A method according to claim 1 wherein said outer wall is molded to form transverse corrugations and said first gas is air.

* * * * *

UNITED STATES PATENT AND TRADEMARK OFFICE
CERTIFICATE OF CORRECTION

PATENT NO. : 3,996,323
DATED : DECEMBER 7, 1976
INVENTOR(S) : WILHELM HEGLER and RALPH-PETER HEGLER It is certified that error appears in the above–identified patent and that said Letters Patent are hereby corrected as shown below:

Column 1, line 49, after "extruded" insert -- from the extruder --.

Column 7, line 12, "1,000" should read -- 1,080 --.

Signed and Sealed this

Eighth Day of March 1977

[SEAL]

Attest:

RUTH C. MASON
Attesting Officer

C. MARSHALL DANN
Commissioner of Patents and Trademarks